(12) United States Patent
Rosales (10) Patent No.: US 11,572,718 B2
(45) Date of Patent: *Feb. 7, 2023

(54) HATCH ARRANGEMENT OF A MOTOR VEHICLE (71) Applicant: Brose Schließsysteme GmbH & Co. Kommanditgesellschaft, Wuppertal, Wuppertal (DE)

(72) Inventor: David Rosales, Rochester Hills, MI (US)

(73) Assignee: Brose Schließsysteme GmbH & Co. Kommanditgesellschaft, Wuppertal, Wuppertal (DE)

(*) Notice: Subject to any disclaimer, the term of this patent is extended or adjusted under 35 U.S.C. 154(b) by 139 days.

This patent is subject to a terminal disclaimer.

(21) Appl. No.: 16/768,858

(22) PCT Filed: Nov. 30, 2018

(86) PCT No.: PCT/EP2018/083218
§ 371 (c)(1),
(2) Date: Jun. 1, 2020

(87) PCT Pub. No.: WO2019/106184
PCT Pub. Date: Jun. 6, 2019

(65) Prior Publication Data
US 2021/0156176 A1 May 27, 2021

Related U.S. Application Data (63) Continuation of application No. 16/057,329, filed on Aug. 7, 2018, which is a continuation-in-part of (Continued)

(51) Int. Cl.
E05B 81/20 (2014.01)
E05F 15/622 (2015.01)
(Continued)

(52) U.S. Cl.
CPC ............ E05B 81/20 (2013.01); B60J 5/101 (2013.01); B60J 5/107 (2013.01); E05B 79/20 (2013.01);
(Continued)

(58) Field of Classification Search
None
See application file for complete search history.

(56) References Cited

U.S. PATENT DOCUMENTS 9,103,154 B2 * 8/2015 Sitzler .................. E05F 15/622
9,255,436 B2 * 2/2016 Schönherr ............ E05F 15/622
(Continued)

FOREIGN PATENT DOCUMENTS

DE 102007046916 A1 * 5/2008 ............ E05B 79/20
EP 1700989 A2 9/2006

OTHER PUBLICATIONS

Machine translation of EP1700989A2.*

Primary Examiner — Marcus Menezes
(74) Attorney, Agent, or Firm — Brooks Kushman P.C.

(57) ABSTRACT

A hatch arrangement for a motor vehicle including a hatch leaf pivotably coupled to a vehicle body being movable between an open hatch position and a closed hatch position, a hatch drive arrangement for moving the hatch leaf, a hatch lock arranged on the hatch leaf, the hatch lock comprising a hatch lock catch, and a cinching system configured to move the hatch lock catch from the secondary latch position to the primary latch position. The hatch arrangement includes, a force transfer arrangement for transferring a force exerted by the hatch drive arrangement to the hatch lock catch, and including a transfer element coupled to the hatch drive arrangement and a Bowden cable connecting the transfer element with the hatch lock catch, and in the closed hatch position of the hatch leaf the hatch arrangement is free from (Continued)

pulling forces between the transfer element and the vehicle body.

21 Claims, 5 Drawing Sheets

Related U.S. Application Data application No. 15/828,879, filed on Dec. 1, 2017, now abandoned.

(51) Int. Cl.
*E05B 83/18* (2014.01)
*B60J 5/10* (2006.01)
*E05F 15/60* (2015.01)
*E05B 79/20* (2014.01)
*E05B 81/70* (2014.01)

(52) U.S. Cl.
CPC ............. *E05B 83/18* (2013.01); *E05F 15/60* (2015.01); *E05F 15/622* (2015.01); *E05B 81/70* (2013.01); *E05Y 2201/22* (2013.01); *E05Y 2900/546* (2013.01)

(56) References Cited

U.S. PATENT DOCUMENTS

| | | | |
|---|---|---|---|
| 9,677,318 B2 * | 6/2017 | Rosales | E05B 81/20 |
| 10,005,498 B2 * | 6/2018 | Rosales | E05B 81/20 |
| 10,801,236 B2 * | 10/2020 | Rosales | E05F 15/60 |
| 11,098,504 B2 * | 8/2021 | Taylor | E05B 81/20 |
| 2005/0039404 A1 * | 2/2005 | Mrkovic | E05F 15/622 |
| | | | 192/48.2 |
| 2009/0217596 A1 * | 9/2009 | Neundorf | E05B 81/20 |
| | | | 49/506 |
| 2012/0299313 A1 * | 11/2012 | Organek | E05B 81/06 |
| | | | 292/129 |
| 2016/0052376 A1 * | 2/2016 | Rosales | E05F 15/70 |
| | | | 49/31 |
| 2017/0089112 A1 * | 3/2017 | Rosales | E05B 79/20 |
| 2020/0123816 A1 * | 4/2020 | Taylor | E05B 79/20 |
| 2021/0010304 A1 * | 1/2021 | Rosales | E05B 81/20 |

* cited by examiner

HATCH ARRANGEMENT OF A MOTOR VEHICLE

CROSS-REFERENCE TO RELATED APPLICATIONS

This application is the U.S. National Phase of PCT Application No. PCT/EP2018/083218 filed on Nov. 30, 2018, which claims priority to U.S. application Ser. No. 16/057,329, filed on Aug. 7, 2018, now U.S. Pat. No. 10,801,236, issued Oct. 13, 2022, which is a continuation-in-part of U.S. application Ser. No. 15/828,879, filed on Dec. 1, 2017, now abandoned, the disclosures of which are hereby incorporated in their entirety by reference herein.

TECHNICAL FIELD

The present disclosure relates to a hatch arrangement for a motor vehicle.

BACKGROUND

Vehicles may include one or more closures, such as, hatches, doors, tailgates, liftgates. Certain closures may close automatically, e.g. without the assistance of an operator. Vehicles generally include a seal or other type of weather proofing barrier positioned between the closure and the vehicle body to mitigate external elements such as moisture, precipitation, dirt, debris, and noise from entering the interior of the vehicle. The force applied to the closure must be sufficient to overcome pressure associated with the closure and the seal.

SUMMARY

The present disclosure may provide a force transfer arrangement for transferring a force, such as a pulling force, exerted by the hatch drive arrangement to the hatch lock catch for moving the hatch lock catch from its secondary latch position to its primary latch position. Also in this case the hatch drive arrangement has two functions, that is, on one hand it is used for moving the hatch leaf between the open hatch position and the closed hatch position, and on the other hand it is used for operating the cinching system. However, according to the invention the hatch drive arrangement does not actuate a separate cinching catch which moves the hatch leaf from an almost closed hatch position in a fully closed hatch position which in turn moves the separate hatch lock catch from the secondary latch position in the primary latch position, but the hatch drive arrangement exerts its force via a transfer element and a Bowden cable to the hatch lock catch itself. Accordingly, the hatch lock catch is moved, namely pulled, from the secondary latch position in the primary latch position directly by the cinching system.

According to one or more embodiments, there is no need for two separate hatch drive arrangements and cinching systems with separate cinching catches and cinching strikers arranged on both sides of the hatch leaf. Moreover, no sensors are required in the hatch lock sensing the secondary latch position and the primary latch position for controlling the hatch drive arrangements. In the present case the internal sensors of the hatch drive arrangement, such as of the spindle drive, may be used to start and stop the driving motion. Accordingly, the construction of the cinching system is more simple and more robust compared to the prior art. Also, since the cinching system directly acts on the hatch lock catch, which is usually arranged substantially in the middle of the outer most hatch leaf edge, there is no longer the need to uniformly operate separate cinching catches at both lateral sides of the hatch leaf.

In detail, according to one or more embodiments the hatch arrangement may include as part of the cinching system a force transfer arrangement for transferring a force, such as a pulling force, exerted by the hatch drive arrangement to the hatch lock catch, the force transfer arrangement comprising a transfer element coupled to the hatch drive arrangement and a Bowden cable connecting the transfer element with the hatch lock catch, and in the closed hatch position of the hatch leaf the hatch arrangement is free from pulling forces between the transfer element and the vehicle body.

In one or more embodiments the functioning of the transfer element of the force transfer arrangement may be provided. As an example, the transfer element merely has the purpose of transferring forces between the hatch drive arrangement and the hatch leaf on one hand and between the hatch drive arrangement and the hatch lock catch on the other hand. Besides that, the transfer element does not need to absorb further loads. As an example, the transfer element is not used to pull the hatch leaf towards the vehicle body to move the hatch leaf from the named almost closed hatch position into the fully closed hatch position. Instead, according to one or more embodiments this is done by the hatch lock catch when engaging the hatch lock striker and when being pulled from the secondary latch position into the primary latch position by the cinching system.

According to one or more embodiments, the transfer element is a lever. With such a lever a force, such as a pulling force, exerted by the hatch drive arrangement may be easily transferred to the Bowden cable connected with the hatch lock catch, while the force, such as the pulling force, exerted by the hatch drive arrangement may also be transferred to the hatch leaf via the lever axis to move the hatch leaf between the open hatch position and the almost closed and the fully closed hatch position. However, it is also conceivable to provide a transfer element which transfers the respective forces and movements linearly. However, as described before, to transfer the linear movement of the hatch drive arrangement into a pivoting movement of the transfer element, which pivoting movement is then transferred into a linear movement of the Bowden cable.

As provided in at least one embodiment, a spindle drive which is an advantageous drive solution for a hatch drive arrangement is provided for both the movement of the hatch leaf and the operation of the cinching system. The construction of a spindle drive is for example described in U.S. Pat. No. 9,255,436 which is hereby incorporated by reference. However, it is also conceivable to use a pushrod drive instead. A pushrod drive construction is for example described in U.S. Pat. No. 9,103,154 which is also hereby incorporated by reference.

According to an embodiment, only one single hatch drive arrangement and such as only one single spindle drive is provided for the above mentioned purposes, that is for moving both the hatch leaf and the hatch lock catch. As already described before, it is no longer necessary to provide two separate hatch drive arrangements and cinching systems, since it is now possible, to transfer the forces, e.g. pulling forces, from the hatch drive arrangement via the transfer element and the Bowden cable directly to the hatch lock catch, which is usually arranged in the middle section of the outer most hatch leaf edge, which is the edge or side of the hatch leaf opposite to the hatch axis.

In one or more embodiments, the hatch drive arrangement makes use of the fact that a Bowden cable can easily penetrate through a separating wall which separates the wet area of the hatch arrangement from the dry area of the hatch arrangement. Since a Bowden cable may include a movable inner cable and a stationary housing, the hole in the separating wall through which the Bowden cable housing extends can be easily sealed.

According to one or more embodiments, the hatch drive arrangement may include means for detecting a condition and/or a position of the hatch drive arrangement which corresponds to the condition of the hatch lock when the hatch lock catch is in the secondary latch position. For example, a pushbutton may be arranged on a housing section of the hatch arrangement, such as a housing section of the spindle drive, which pushbutton is actuated in a specific position of the housing section relative to the vehicle body, for example, when the housing section presses the pushbutton against the vehicle body. At the same time when the pushbutton is actuated, the hatch lock catch is moved in the second latch position. In the condition of the hatch lock the actuation of the pushbutton may cause the hatch drive arrangement, such as the spindle drive, to exert a higher force, e.g. pulling force, than before, such that a higher pulling force is applied to the hatch lock catch while moving from the secondary latch position to the primary latch position. It is also conceivable to use a Hall-effect sensor, which for example counts the revolutions of the drive shaft of the hatch drive arrangement motor, such as the motor of the spindle drive. By counting the revolutions, the condition of the hatch drive arrangement may also be detected which corresponds to the condition of the hatch lock when the hatch lock catch is moved in the secondary latch position.

The hatch arrangement may include at least one elastic member which forces the transfer element in the direction of the first transfer element position.

The hatch arrangement may include means for detecting a condition and/or a position of the hatch drive arrangement and/or a hard stop or damping stop may be provided.

The cinching system and/or transfer element may also cause the hatch lock catch to move from the secondary latch position into the primary latch position without provision of the described Bowden cable. Accordingly, in the embodiment the hatch arrangement does not comprise a Bowden cable connecting the transfer element with the hatch lock catch. The individual features of the hatch arrangement can be designed as described above and below.

BRIEF DESCRIPTION OF THE DRAWINGS

In the following, the invention will be described with reference to a single exemplary embodiment illustrated in the drawing. The drawing shows in FIG. 1 a schematic side view of a motor vehicle with a hatch arrangement according to the proposal, FIG. 2 a more detailed view of a part of the hatch arrangement of FIG. 1 a) with the hatch leaf in an open hatch position and b) with the hatch leaf in an almost closed hatch position, FIG. 3 the detail III of FIG. 2 in an enlarged view a) with the hatch leaf in the almost closed hatch position and b) with the hatch leaf in a fully closed hatch position and FIG. 4 the detail Ill of FIG. 2 in an enlarged view with the hatch leaf in the fully closed hatch position after the hatch drive arrangement is turned off, and FIG. 5 a further embodiment of the hatch arrangement in a detailed view a) with the hatch leaf in the almost closed hatch position and b) with the hatch leaf in a fully closed hatch position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Presently, the expression "hatch arrangement" is to be understood in a broad sense. It includes such as any kind of doors of a motor vehicle such as side doors or back doors as well as tailgates, liftgates, trunk lids or engine hoods.

From the prior art and in particular U.S. Pat. No. 9,677, 318 B2 a power tailgate with a cinching system is known. Once the catch of the hatch lock of the tailgate has reached its secondary latch position, the cinching system acts on the hatch lock to move the catch from the secondary latch position to the primary latch position, thereby ensuring an automatic closing of the hatch which is secure and complete.

In the prior art described above, the cinching system is built outside the hatch lock (external cinching system). According to the prior art the hatch arrangement may include in one embodiment two hatch drive arrangements which both comprise a spindle drive. One end of the respective hatch drive arrangement is coupled to the vehicle body and the other end is coupled to a pivotable cinching catch of the cinching system. The cinching catch, which is arranged on the hatch leaf, is configured for engaging a cinching striker of the motor vehicle, which is arranged on the vehicle body. The respective hatch drive arrangement has two functions; on one hand the hatch drive arrangement is able to move the hatch leaf between an open hatch position and a closed hatch position and on the other hand the hatch drive arrangement also forms the drive for the cinching system when the hatch is almost closed. In the corresponding position of the hatch leaf at that time the hatch drive arrangement, such as the spindle drive, courses a pivoting of the cinching catch towards a closed cinching catch position in which the cinching catch engages the cinching striker. By thus moving the cinching catch, the hatch leaf is also moved from the almost closed hatch position in the fully closed hatch position. The movement of the hatch leaf in turn causes the hatch lock catch, which then is in contact with a corresponding hatch lock striker, to move from the secondary latch position in the primary latch position.

Although the hatch arrangement according to the prior art described above is very reliable, the construction of the hatch arrangement is quite complex, since on both sides of the hatch a respective hatch drive arrangement is needed to uniformly move the hatch leaf in the closed hatch position.

It is therefore an object of the invention to improve the known hatch arrangement including a cinch system to make it more simple and more robust in its construction and to overcome the aforementioned drawbacks.

Figure 1:
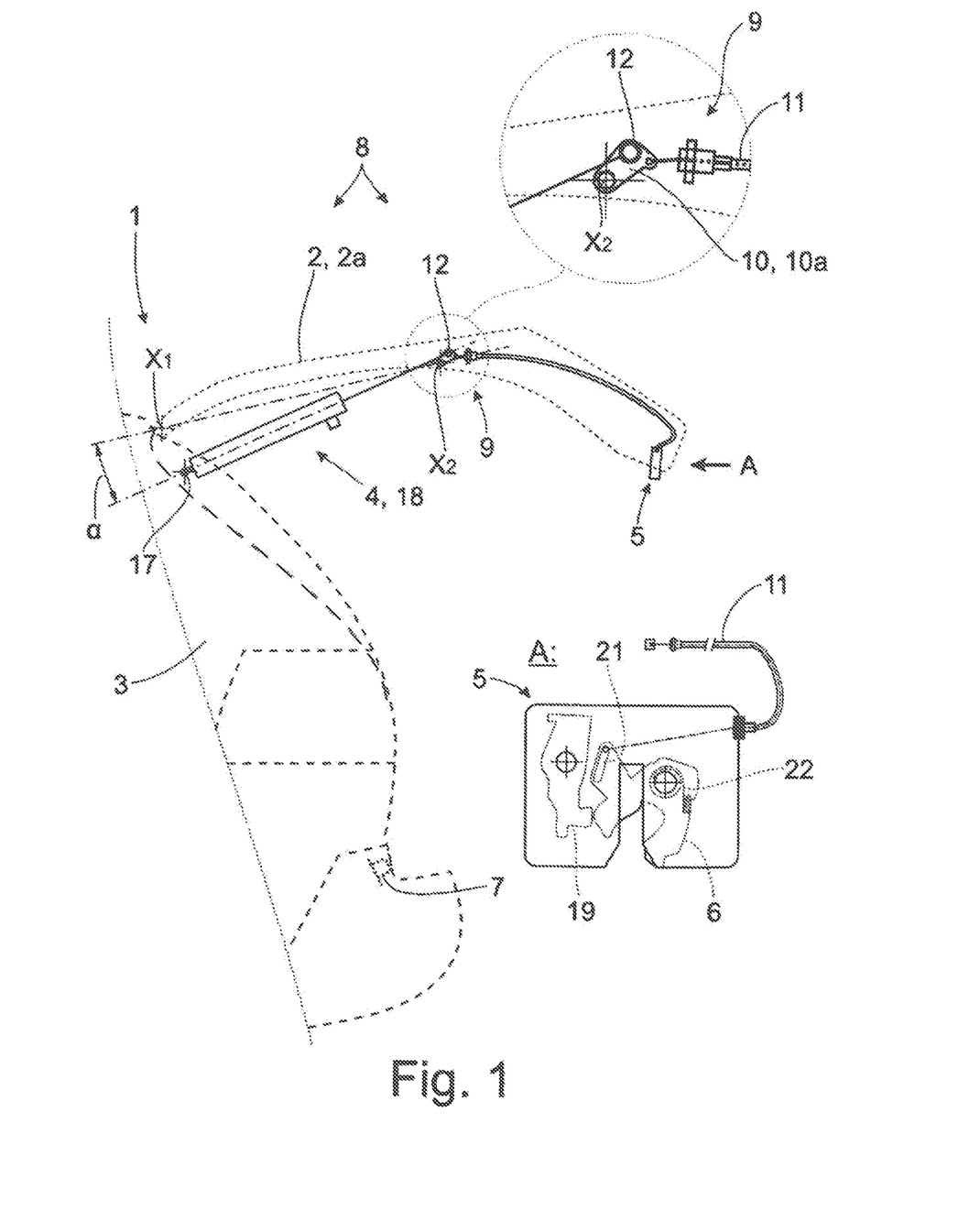
Figure 2:
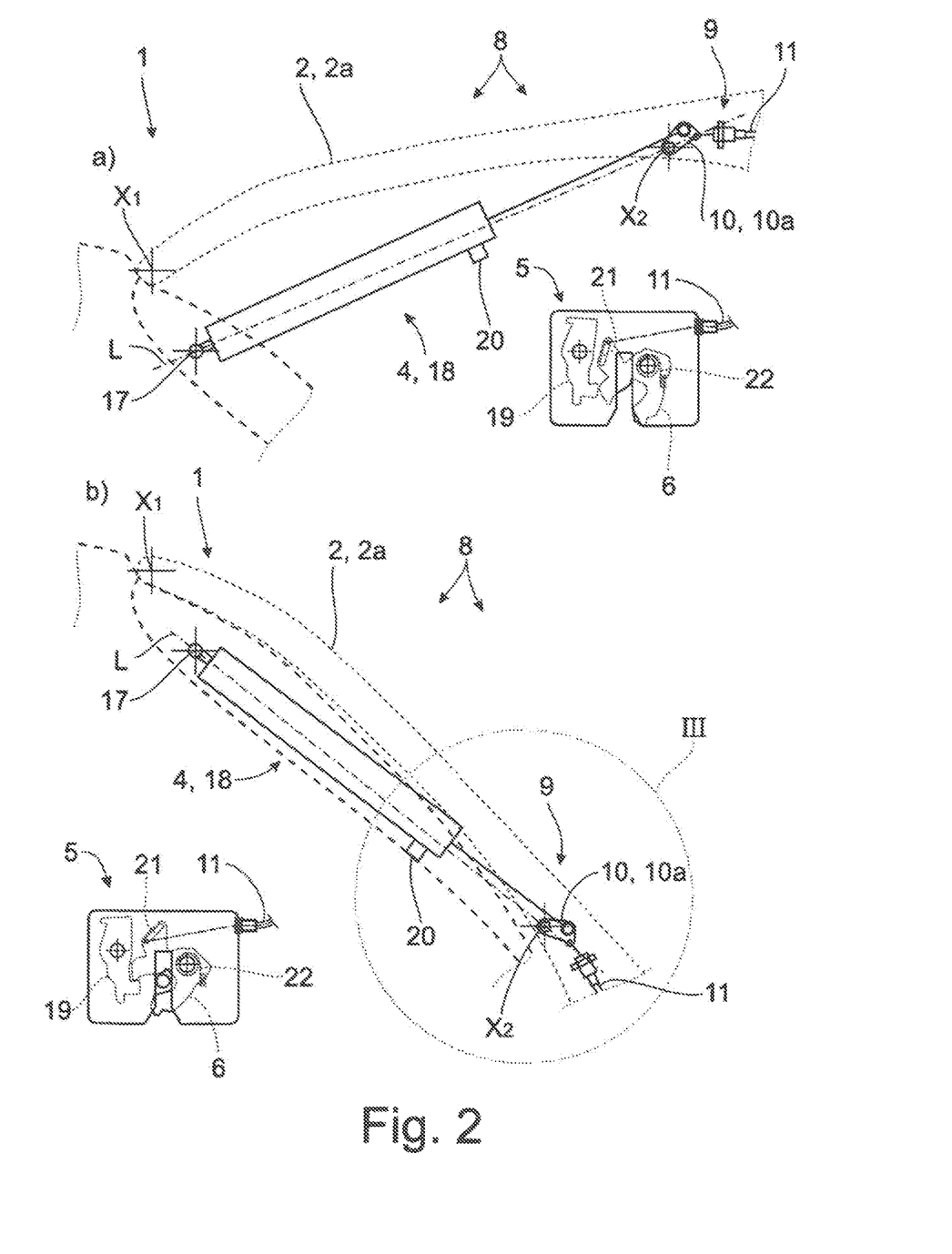
Figure 3:
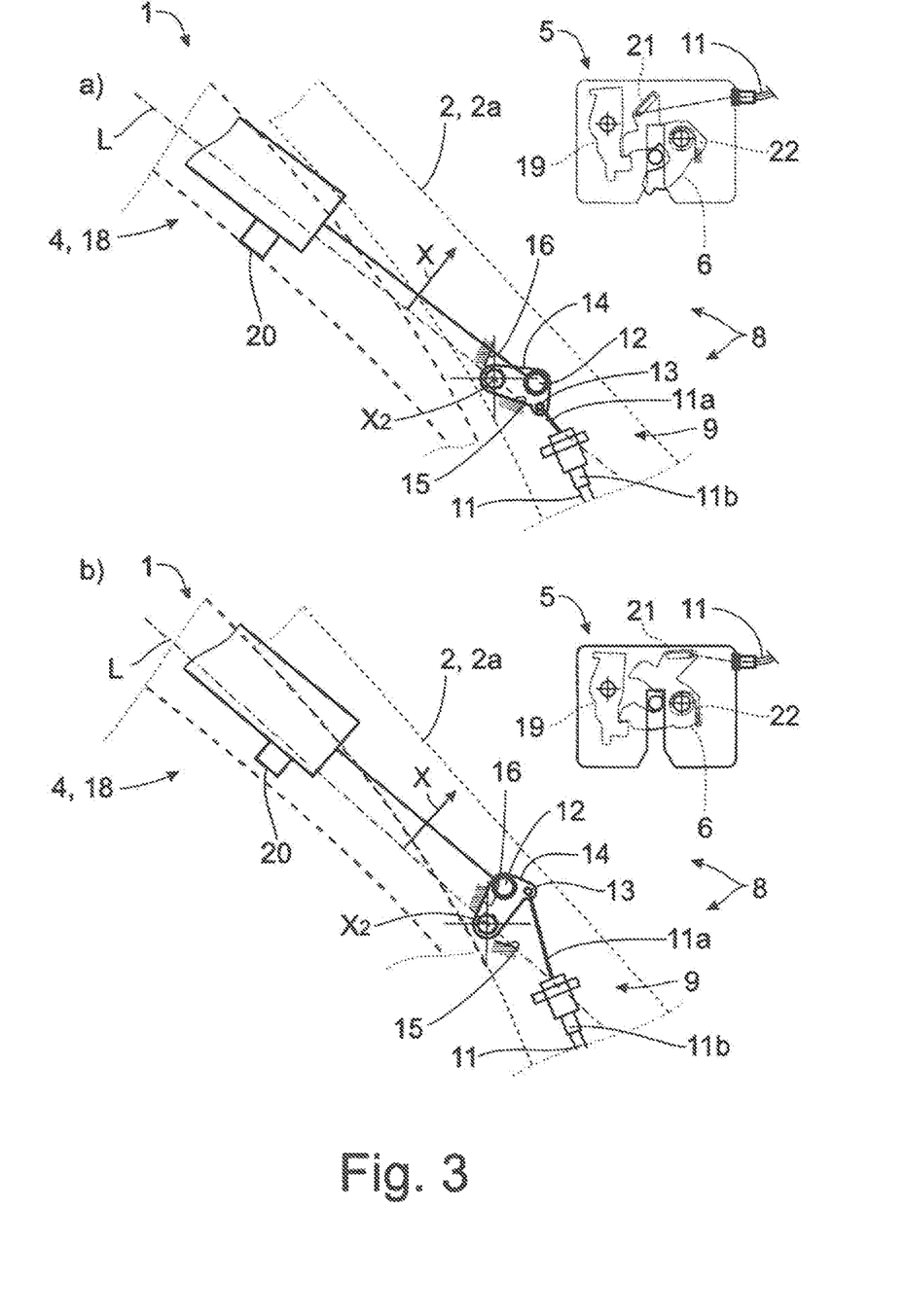

The hatch arrangement shown in the figures is assigned to a motor vehicle 1 shown partially in FIG. 1. The hatch arrangement may include a hatch leaf 2—in the embodiment shown the hatch leaf 2 is a tailgate 2a—pivotably coupled to a vehicle body 3 of the motor vehicle 1 and being movable between an open hatch position (FIG. 1, FIG. 2a) and a closed hatch position, such as an almost closed hatch position (FIG. 2b, FIG. 3a) and a fully closed hatch position (FIG. 3b). The hatch arrangement may also comprise any other kind of door of a motor vehicle, such as a sliding door. The hatch arrangement further may include a hatch drive arrangement 4 for moving the hatch leaf 2. As an example, the hatch drive arrangement 4 may be configured for moving the hatch leaf 2 between the open hatch position and the respective closed hatch position in one or both directions.

Furthermore, a hatch lock 5 is arranged on the hatch leaf 2, the hatch lock 5 comprising a hatch lock catch 6 for engaging a hatch lock striker 7 in a retaining manner in a secondary latch position and in a primary latch position and for disengaging the hatch lock striker 7 in an open latch position. The hatch lock catch 6 being in the secondary latch position is shown in FIG. 2b and FIG. 3a. The hatch lock catch 6 being in the primary latch position is shown in FIG. 3b. The open latch position of the hatch lock catch 6 is shown in FIG. 1 and FIG. 2a. It can be seen that when the hatch leaf 2 is in the open hatch position, the hatch lock catch 6 is in the open latch position. When the hatch leaf 2 has been moved from the open hatch position to the almost closed hatch position shown in FIG. 2b, the hatch lock catch 6 is in the secondary latch position. When having moved the hatch leaf 2 further into the fully closed hatch position, as shown in FIG. 3b, the hatch lock catch 6 is in the primary latch position.

As described above, the movements of the hatch leaf 2 are caused by the hatch drive arrangement 4. The movement of the hatch lock catch 6 from the secondary latch position in the primary latch position is caused by a cinching system 8.

The proposed hatch arrangement is characterized in that it may include, as part of the cinching system 8, a force transfer arrangement 9 for transferring a force, here and such as a pulling force, exerted by the hatch drive arrangement 4 to the hatch lock catch 6. The force transfer arrangement 9 may include a transfer element 10 coupled to the hatch drive arrangement 4 and a Bowden cable 11 connecting the transfer element 10 with the hatch lock catch 6, thereby coupling the hatch drive arrangement 4 to the hatch lock catch 6. The hatch drive arrangement 4 therefore does not only move the hatch leaf 2 between the respective hatch positions, but also causes the movement of the hatch lock catch 6 from the secondary latch position in the primary latch position in a cinching action. Accordingly, the cinching system 8 directly acts on the hatch lock catch 6 (internal cinching system).

As can be seen in the figures, in the closed hatch position of the hatch leaf 2, such as in the almost closed hatch position as shown in FIG. 2b and FIG. 3a and/or in the fully closed hatch position as shown in FIG. 3b, the hatch arrangement is free from pulling forces between the transfer element 10 and the vehicle body 3. As an example, the only pulling forces holding the hatch leaf 2 in its respective closed hatch position are pulling forces between the hatch lock catch 6 and the hatch lock striker 7. Accordingly, in the hatch arrangement such as only the hatch lock catch 6 provides a locking function between the hatch leaf 2 and the vehicle body 3. In contrast to the prior art, the transfer element 10 itself may not provide a locking function between the hatch leaf 2 and the vehicle body 3.

As an example, at least during most of the movement of the hatch lock catch 6 from the secondary latch position to the primary latch position, may during the whole movement of the hatch lock catch 6 from the secondary latch position to the primary latch position, no forces at all are transferred from the transfer element 10 to the vehicle body 3.

In the particular embodiment shown in the figures, the transfer element 10 is formed as a lever 10a which is mounted to the hatch leaf 2. The lever 10a is pivotable around a lever axis $x_2$. However, for transferring the forces from the hatch drive arrangement 4 to both the hatch leaf 2 and the hatch lock catch 6 it is also conceivable to use a linearly movable transfer element as well.

In the present case the hatch drive arrangement 4 is coupled to the transfer element 10, here to the lever 10a, at a first coupling point 12. The Bowden cable 11 is coupled to the same transfer element 10 at a second coupling point 13. The first coupling point 12 and the second coupling point 13 are offset from the lever axis $x_2$. In the present case the lever 10a is mounted at a lateral side of the hatch leaf 2, that is the lateral edge of the hatch leaf 2 extending substantially perpendicular to the hatch axis $x_1$. Here, the lever axis $x_2$ is substantially parallel to the hatch axis $x_1$.

With the above described construction of the exemplary embodiment, a linear movement of the hatch drive arrangement 4 is transferred into a pivoting movement of the transfer element 10, which pivoting movement is transferred into a further linear movement of the Bowden cable 11. A linear movement of the Bowden cable 11 means that an inner cable 11a of the Bowden cable 11 moves back and forth inside the Bowden cable housing 11b formed around the inner cable 11a. The Bowden cable housing 11b itself is fixed and therefore cannot move back and forth.

Accordingly, in the proposed hatch arrangement shown in the exemplary embodiment of the figures the hatch drive arrangement 4 and the Bowden cable 11 both linearly transfer forces, whereas the lever 10a transfers forces by pivoting. Here, the only torque exerted on the lever 10a is a torque exerted by the hatch drive arrangement 4 and the Bowden cable 11.

According to a preferred embodiment the inner cable 11a of the Bowden cable 11 may be coupled to the transfer element 10 such that, during a movement of the transfer element 10 from the first transfer element position to the second transfer element position, the inner cable 11a of the Bowden cable 11 is partially wound around the transfer element 10, as for example shown in FIGS. 5a and b. This has the advantage that the movement of the hatch lock catch 6 can be effected with a smaller pivoting movement of the transfer element 10. In the embodiment of FIGS. 5a and b, also the positions of the first coupling point 12 and the second coupling point 13 are mirrored compared to FIGS. 1 to 3.

As best can be seen in FIGS. 3a and b, the transfer element 10 may include an effective lever arm 14, here such as exactly one effective lever arm 14, and both the first coupling point 12 and the second coupling point 13 are arranged on the same effective lever arm 14. The transfer element 10, here the lever 10a, is movable between a first transfer element position (FIG. 3a) and a second transfer element position (FIG. 3b). As an example, the movement of the transfer element 10 from the first transfer element position to the second transfer element position effects an increasement of the angle α defined between a first straight line that runs through the hatch axis $x_1$ and the lever axis $x_2$ and a second straight line that runs through the first coupling point 12 and a connecting point 17 in which the hatch drive arrangement 4 is coupled to the vehicle body 3. The angle α is defined as the smaller angle of the two congruent angles defined by the first and second straight line, which angle α is therefore acute or right-angled.

Moreover, in the embodiment the movement of the transfer element 10 from the first transfer element position to the second transfer element position effects the movement of the hatch lock catch 6 from the secondary latch position in the primary latch position.

The hatch drive arrangement 4, the force transfer arrangement 9 and/or the hatch leaf 2 are arranged and configured such that a movement of the transfer element 10 from the first transfer element position to the second transfer element position is only effected after the hatch leaf 2 has been moved from the open hatch position to the almost closed hatch position, the latter shown in FIG. 3a. In contrast thereto, when the hatch leaf 2 is in an open hatch position, the hatch drive arrangement 4 is only able to move the hatch leaf 2 into the almost closed hatch position shown in FIG. 2b and FIG. 3a. During the movement of the hatch leaf 2 from the open hatch position to the almost closed hatch position, the transfer element 10, here the lever 10a, does not move, but remains in its first transfer element position. To hold the transfer element 10 in the first transfer element position during movement of the hatch leaf 2 from the open hatch position to the almost closed hatch position, also an elastic member 22, 23, e.g. a spring, may be provided which forces the transfer element 10 in the direction of the first transfer element position. In this case one elastic member 22 is a spring, such as a rotational spring, acting on the hatch lock catch 6 such that the hatch lock catch 6 is forced towards the open latch position. The elastic member 22 is positioned such that it acts indirectly on the transfer element 10 via the hatch lock catch 6 and/or the Bowden cable 11.

Figure 4:
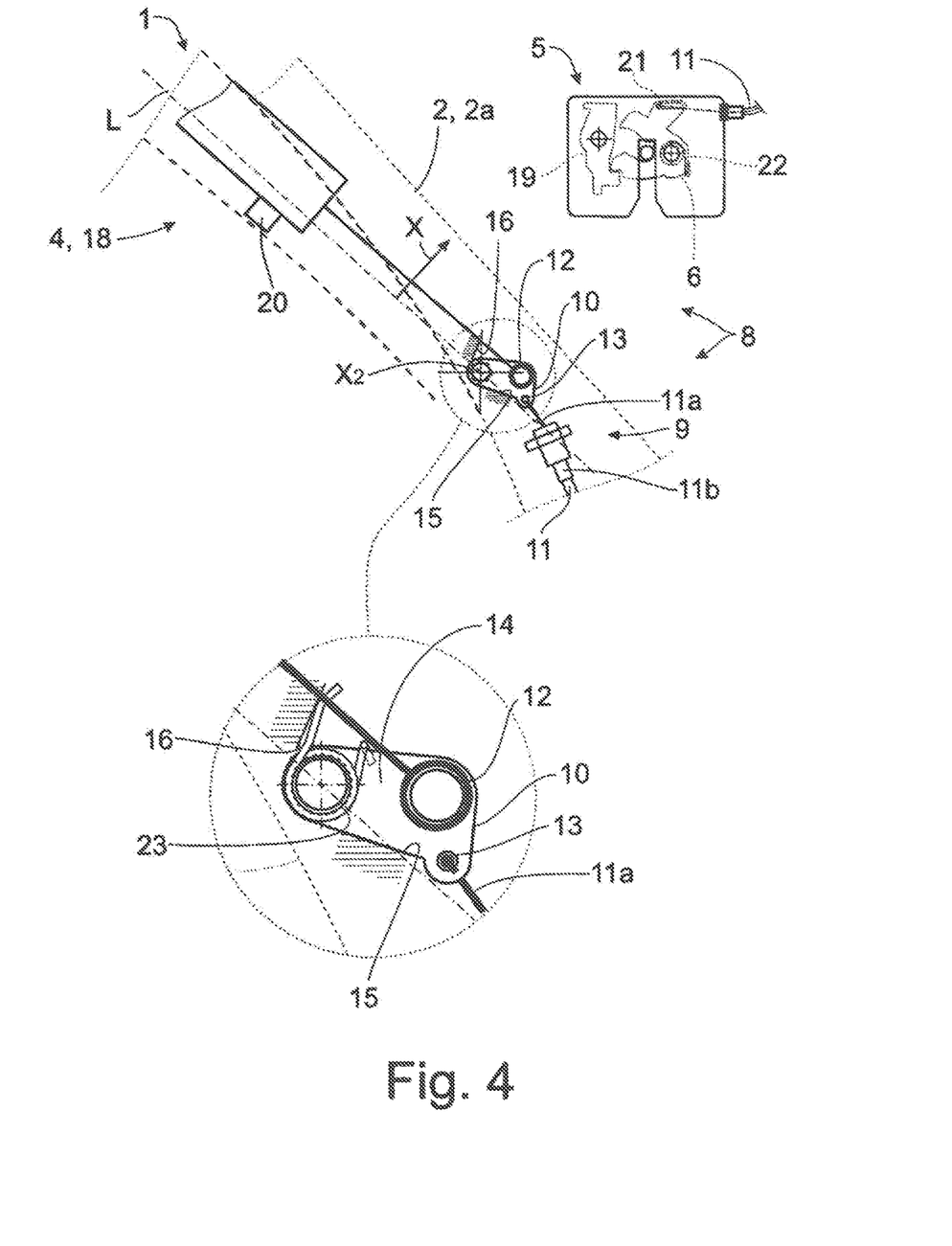
Figure 5:
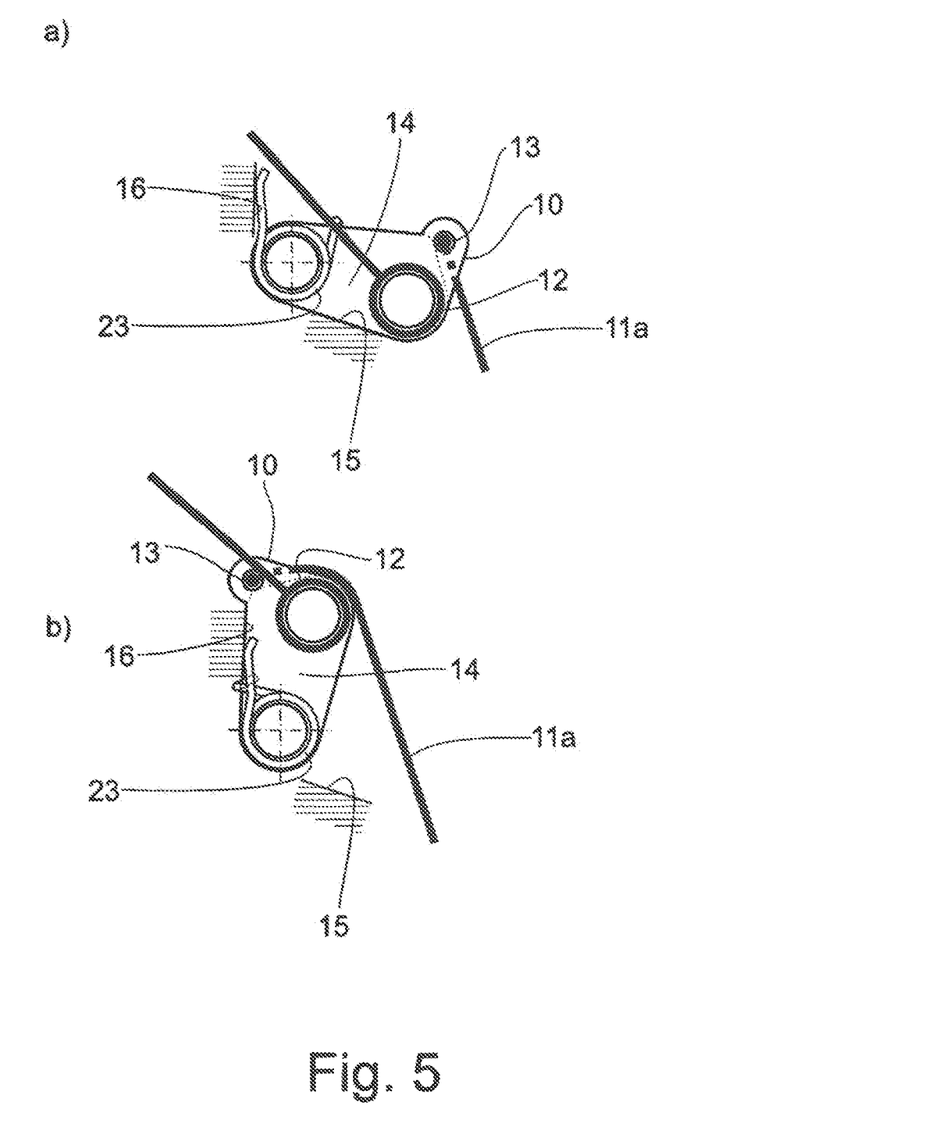

In addition or alternatively, as shown for example in FIGS. 4 and 5, a different elastic member 23 may be positioned such that it acts directly on the transfer element 10. The latter, which may also be a spring, such as a rotational spring, has the further advantage that the transfer element 10 is moved from its second transfer element position (FIG. 5b) to its first transfer element position (FIGS. 4 and 5a) after the hatch lock catch 6 has reached its primary latch position and after the hatch drive arrangement 4 is turned off. By means of the elastic member 23 the hatch drive arrangement 4 follows the movement of the transfer element 10 accordingly.

As soon as the hatch leaf 2 reaches, during its closing movement, the almost closed hatch position of FIG. 3a, the force exerted by the hatch drive arrangement 4 to the transfer element 10 is increased such that the transfer element 10 is pulled from its first transfer element position to its second transfer element position. This in turn causes the respective movement of the Bowden cable 11 and accordingly of the hatch lock catch 6 from the secondary latch position into the primary latch position, thereby forcing the hatch leaf 2 from the almost closed hatch position of FIG. 3a into the fully closed hatch position of FIG. 3b.

In the shown embodiment, the first transfer element position and the second transfer element position are both defined by a respective end stop 15, 16, both end stops 15, 16 being formed on the hatch leaf 2, such as on the lateral side or edge of the hatch leaf 2. The end stops 15, 16 are arranged such that, when the transfer element 10, here the lever 10a, is in the first transfer element position, the first coupling point 12 is positioned at one side of an imaginary line L which extends through the first coupling point 12 and a connecting point 17 in which the hatch drive arrangement 4 is coupled to the vehicle body 3 and which may be offset from the hatch axis $x_1$. As an example, the named side of the imaginary line L is the side facing in a direction X from the vehicle body 3 towards the hatch leaf 2.

The imaginary line L defines a dead point for the first coupling point 12. If the lever 10a would be pivoted into a position where the first coupling point 12 is positioned on the imaginary line L—the position being the dead point—, no torque would be transferred from the hatch drive arrangement 4 to the transfer element 10 and the transfer element 10 would not move. To avoid this, in the exemplary embodiment shown in the figures during the whole movement of the transfer element 10 from the first transfer element position to the second transfer element position the first coupling point 12 does not cross the imaginary line L. In the contrary, as can be seen from FIGS. 3a and b, due to the end stops 15, 16, such as the end stop 15 defining the first transfer element position, the first coupling point 12 has a motion path which is completely on the side of the imaginary line L facing in the direction X. Therefore, the first coupling point 12 cannot be positioned in the dead point on the imaginary line L or even on the opposite side of the imaginary line L. However, it is also conceivable to provide a construction where the first coupling point 12 would be arranged in the dead point or even on the opposite side of the imaginary line L, when the transfer element 10 is in its first transfer element position. Such a construction however requires means that push the transfer element 10 towards the side of the imaginary line L facing in the direction X, when the hatch leaf 2 reaches the almost closed hatch position shown in FIG. 3a during its closing movement. Such a means could for example be a protrusion arranged on the vehicle body 3 facing in the direction X. Accordingly, when the hatch leaf 2 reaches the almost closed hatch position, the means or protrusion, respectively, moves the transfer element 10 from its first transfer element position into a position where the first coupling point 12 is on the respective other side of the imaginary line L.

It is preferred that the hatch drive arrangement 4 may include a spindle drive 18. The hatch drive arrangement 4 may also comprise any other kind of type of drive, such as linear drive, for example a pushrod drive. A movement of the respective drive, such as spindle drive 18, is then transferred via the transfer element 10 and the Bowden cable 11 to the hatch lock catch 6 as well as to the hatch leaf 2.

It is also preferred that the hatch lock 5 is arranged on the side or edge of the hatch leaf 2 which is opposite to the hatch axis $x_1$, that is the side facing away from the hatch axis $x_1$. The hatch lock 5 can thereby be arranged substantially in the middle of the respective side of the hatch leaf 2 such that, when the hatch lock catch 6 is moved from the secondary latch position to the primary latch position, the hatch leaf 2 is uniformly moved from the almost closed hatch position of FIG. 3a in the fully closed hatch position in FIG. 3b.

Since the cinching system 8 may only use one single catch, namely the hatch lock catch 6, merely one single hatch drive arrangement 4 with one single force transfer arrangement 9 of the type describe before and such as merely one single spindle drive 18 is needed to apply the required forces to the hatch leaf 2 and to the hatch lock catch 6. As an example, the hatch drive arrangement 4 and/or the spindle drive 18 is placed e.g. in a rainwater gutter associated with the hatch leaf 2.

The hatch drive arrangement 4 may be arranged in the wet area of the hatch arrangement, whereas the hatch lock 5 is arranged in the dry area of the hatch arrangement. Moreover the transfer element 10 is arranged in the wet area of the hatch arrangement, and the Bowden cable 11 extends from the wet area to the dry area through a seal in a separating wall (not shown) which separates the wet area from the dry area.

The hatch lock 5 arranged on the hatch leaf 2 is shown in FIGS. 2a and b and FIGS. 3a and b together with the hatch leaf 2 being in an associated hatch position. According to this preferred embodiment, the hatch lock 5 not only may include the hatch lock catch 6 for engaging the hatch lock striker 7 as described before, but also may include a pawl 19 for a blocking engagement with the hatch lock catch 6 and a release actuation lever (not shown) for deflecting the pawl 19 as well as other components of a vehicle lock. Moreover, in the exemplary embodiment shown in the figures the hatch lock catch 6 may include means 21 for movably attaching the Bowden cable 11 such that the Bowden cable 11, such as the inner cable, is always on tension and does not sag such as when the hatch lock catch 6 is moved from the open latch position to the secondary latch position. Here for example a slotted hole is provided in the hatch lock catch 6, in which the respective end of the Bowden cable 11 is movably guided.

The hatch drive arrangement 4 may include means for detecting a condition and/or a position of the hatch drive arrangement 4. In the present embodiment, an electronic pushbutton 20 is arranged on the housing of the hatch drive arrangement 4, such as on the housing of the spindle drive 18. While the hatch drive arrangement 4 moves the hatch leaf 2 from the open hatch position to the almost closed hatch position, in the almost closed hatch position the pushbutton 20 comes into contact with the vehicle body 3 (FIG. 2b). At the same time, what also can be seen in FIG. 2b, the hatch lock striker 7 has pushed the hatch lock catch 6 into the secondary latch position. Accordingly, the means or pushbutton 20, respectively, is suitable to detect a condition and/or position of the hatch drive arrangement 4 which corresponds to the condition of the hatch lock 5 when the hatch lock catch 6 is in the secondary latch position. Actuation of the pushbutton 20 may then generate a signal that causes the hatch drive arrangement 4 or spindle drive 18, respectively, to exert a larger force, e.g. pulling force, for the purpose of moving the hatch lock catch 6 from the secondary latch position in the primary latch position. It is also conceivable to e.g. use a Hall-effect sensor, such as a Hall-effect sensor of the spindle drive 18, for the same purpose. The Hall-effect sensor such as is an incremental sensor and counts the revolutions of the drive shaft of the hatch drive arrangement 4 or spindle drive 18, respectively. Since a specific number of revolutions can be associated with a specific latch position, also by means of a Hall-effect sensor the exerted force of the hatch drive arrangement 4 may be increased as soon as the hatch lock catch 6 is in its secondary latch position.

In addition or alternatively to the means for detecting a condition and/or a position of the hatch drive arrangement 4, such as the pushbutton 20, a hard stop or damping stop (soft stop) may be provided which dampens or limits or even reverses the lateral movement of the hatch drive arrangement 4 relative to the vehicle body 3, when the hatch drive arrangement 4 moves the hatch leaf 2 in the direction from the open hatch position to the closed hatch position. Such a limitation or reversal of the lateral movement of the hatch drive arrangement 4 causes the movement of the transfer element 10 from the first transfer element position to the second transfer element position to be supported.

Such a hard stop or damping stop may be arranged on the vehicle body 3 and come into contact with the housing of the hatch drive arrangement 4, and/or may be arranged on the housing of the hatch drive arrangement 4 and come into contact with the vehicle body 3. The hard stop or damping stop may be arranged such that it comes into contact with the respective opposite surface (the housing of the hatch drive arrangement 4 and the vehicle body 3 respectively) only while the hatch lock catch 6 is in its secondary latch position, or also while the hatch lock catch 6 moves between its secondary latch position and its primary latch position. The same applies to the means for detecting a condition and/or a position of the hatch drive arrangement 4, such as the pushbutton 20. In so far, also the means for detecting a condition and/or a position of the hatch drive arrangement 4, such as the pushbutton 20, may serve as a hard stop or damping stop.

It is pointed out that the described cinching system 8 and/or transfer element 10 may also cause the hatch lock catch 6 to move from the secondary latch position into the primary latch position without provision of the described Bowden cable. In such an embodiment the hatch arrangement does not comprise a Bowden cable connecting the transfer element 10 with the hatch lock catch 6.

The force acting on the hatch lock catch 6 to move from the secondary latch position into the primary latch position is transferred from the hatch drive arrangement 4 merely via the transfer element 10 to the hatch leaf 2, and from the hatch leaf 2 to the hatch lock catch 6. For optimizing the force transfer from the hatch drive arrangement 4 to the hatch leaf 2, a movement of the transfer element 10 from the first transfer element position to the second transfer element position effects, when the hatch lock catch 6 has reached its secondary latch position, an increasement of the angle α defined between a first straight line that runs through the hatch axis $x_1$ and the lever axis $x_2$ and a second straight line that runs through the first coupling point 12 and a connecting point 17 in which the hatch drive arrangement 4 is coupled to the vehicle body 3.

Accordingly, independently from the foregoing the present invention also relates to a hatch arrangement for a motor vehicle, which may include a hatch leaf 2 pivotably coupled to a vehicle body 3 of the motor vehicle 1 and being movable around a hatch axis $x_1$ between an open hatch position and a closed hatch position. The hatch arrangement further may include a hatch drive arrangement 4 for moving the hatch leaf 2, and a hatch lock 5 arranged on the hatch leaf 2, the hatch lock 5 comprising a hatch lock catch 6 for engaging a hatch lock striker 7 in a retaining manner in a primary latch position and in a secondary latch position and for disengaging the hatch lock striker 7 in an open latch position. Furthermore, the hatch arrangement may include a cinching system 8 configured to move the hatch lock catch 6 from the secondary latch position to the primary latch position.

The hatch arrangement also may include, as part of the cinching system 8, a force transfer arrangement 9 for transferring a force, such as a pulling force, exerted by the hatch drive arrangement 4 to the hatch lock catch 6, the force transfer arrangement 9 comprising a transfer element 10 being coupled to the hatch drive arrangement 4 and being pivotably mounted at the hatch leaf 2. In contrast to the prior art, also in this embodiment in the closed hatch position of the hatch leaf 2 the hatch arrangement is free from pulling forces between the transfer element 10 and the vehicle body 3.

Moreover, the force applied on the hatch lock catch 6 to move from the secondary latch position into the primary latch position is transferred from the hatch drive arrangement 4 merely via the transfer element 10 to the hatch leaf 2, and from the hatch leaf 2 to the hatch lock catch 6. In so far, the cinching system 8 is configured to indirectly move the hatch lock catch 6 from the secondary latch position to the primary latch position, and not directly via a Bowden cable.

A movement of the transfer element 10 from a first transfer element position to a second transfer element position, which effects the movement of the hatch lock catch 6 from the secondary latch position into the primary latch position, effects an increasement of the angle α defined between a first straight line that runs through the hatch axis $x_1$ and the lever axis $x_2$ of the transfer element 10 and a second straight line that runs through a first coupling point 12 in which the hatch drive arrangement 4 is coupled to the transfer element 10 and a connecting point 17 in which the hatch drive arrangement 4 is coupled to the vehicle body 3.

Further, a hatch drive arrangement 4 for a hatch arrangement according to the proposal and any of its preferred embodiments is claimed.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 1 motor vehicle
2 hatch leaf
3 vehicle body
4 hatch drive arrangement
5 hatch lock
6 hatch lock catch
7 hatch lock striker
8 cinching system
9 force transfer arrangement
10 transfer element
11 bowden cable
12 first coupling point
13 second coupling point
14 effective lever arm
15 end stop
16 end stops
17 point
18 spindle drive
19 pawl
20 pushbutton
21 means
22 elastic member
23 different elastic member
2a tailgate
10a lever
11a inner cable
11b bowden cable housing While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A hatch arrangement for a motor vehicle including a vehicle body, the hatch arrangement comprising:

a hatch leaf pivotably coupled to the vehicle body and movable about a hatch axis between an open hatch position and a closed hatch position;

a hatch lock arranged on the hatch leaf and including,
a hatch lock catch configured to engage a hatch lock striker to retain the hatch leaf to the vehicle body when the hatch lock is in a primary latch position and a secondary latch position and to disengage the hatch lock striker when the hatch lock is in an open latch position; and a hatch drive arrangement configured to move the hatch leaf and including,
a cinching system configured to move the hatch lock catch from the secondary latch position to the primary latch position, and including,
a force transfer arrangement including a transfer element, coupled to the hatch drive arrangement, and a Bowden cable connecting the transfer element to the hatch lock catch, wherein the force transfer arrangement is configured to transfer a force exerted by the hatch drive arrangement to the hatch lock catch, and wherein when the hatch leaf is in the closed hatch position, the hatch drive arrangement is free from pulling forces between the transfer element and the vehicle body.

2. The hatch arrangement of claim 1, wherein the transfer element itself does not move the hatch lock catch from the open latch position to the primary latch position or the secondary latch position.

3. The hatch arrangement of claim 1, wherein as the hatch lock catch moves from the secondary latch position to the primary latch position, no forces are transferred from the transfer element to the vehicle body.

4. The hatch arrangement of claim 1, wherein the transfer element is a lever mounted to the hatch leaf and pivotable about a lever axis, the hatch drive arrangement is coupled to the transfer element at a first coupling point, and the Bowden cable is coupled to the transfer element at a second coupling point, wherein the first coupling point and the second coupling point are offset from the lever axis.

5. The hatch arrangement of claim 4, wherein the transfer element includes a lever arm wherein the first coupling point and the second coupling point are each arranged on the lever arm.

6. The hatch arrangement of claim 5, wherein the transfer element is movable between a first transfer element position and a second transfer element position.

7. The hatch arrangement of claim 6, wherein movement of the transfer element from the first transfer element position to the second transfer element position increases an angle defined by a first straight line, extending through the hatch axis and the lever axis, and a second straight line, extending through the first coupling point and a connecting point where the hatch drive arrangement is coupled to the vehicle body.

8. The hatch arrangement of claim 6, wherein moving the transfer element from the first transfer element position to the second transfer element position moves the hatch lock catch from the secondary latch position to the primary latch position.

9. The hatch arrangement of claim 6, wherein the Bowden cable includes an inner cable coupled to the transfer element such that, as the transfer element moves from the first transfer element position to the second transfer element position, the inner cable of the Bowden cable is partially wound around the transfer element.

10. The hatch arrangement of claim 6, wherein the first transfer element position is defined by a first stop position or the second transfer element position is defined by a second end stop, wherein at least one of the first stop position or the second end stop is formed by or disposed on the hatch leaf.

11. The hatch arrangement of claim 6, wherein, when the transfer element is in the first transfer element position, the first coupling point is positioned on a side of a line extending through the first coupling point and a connecting point where the hatch drive arrangement is coupled to the vehicle body, wherein the side of the line faces in a direction from the vehicle body towards the hatch leaf.

12. The hatch arrangement of claim 11, wherein when the transfer element moves from the first transfer element position to the second transfer element position, the first coupling point does not move across the line.

13. The hatch arrangement of one claim 1, wherein the hatch drive arrangement includes a spindle drive.

14. The hatch arrangement of claim 1, wherein the hatch lock is arranged on a side of the hatch leaf opposite the hatch axis.

15. The hatch arrangement of claim 1, wherein the hatch arrangement includes a wet area and a dry area and the hatch drive arrangement is arranged in the wet area and the hatch lock is arranged in the dry area of the hatch arrangement.

16. The hatch arrangement of claim 1, wherein the hatch drive arrangement includes means for detecting a condition or a position of the hatch drive arrangement when the hatch lock catch is in the secondary latch position.

17. The hatch arrangement of claim 12, wherein the hatch drive arrangement includes at least one elastic member configured to force the transfer element position towards the first transfer element position, wherein the at least one elastic member is configured to hold the transfer element in the first transfer element as the hatch leaf moves from the open hatch position to a partially closed hatch position.

18. The hatch arrangement of claim 17, wherein the at least one elastic member is positioned such that the at least one elastic member acts indirectly on the transfer element via the hatch lock catch or the Bowden cable, or a second elastic member is positioned such that the second elastic member acts directly on the transfer element.

19. The hatch arrangement of claim 1, further comprising means for detecting a condition or a position of the hatch drive arrangement or a hard stop or damping stop configured to dampen, limit, or reverse a lateral movement of the hatch drive arrangement relative to the vehicle body as the hatch drive arrangement moves the hatch leaf from the open hatch position to the closed hatch position.

20. A hatch arrangement, for a motor vehicle provided with a vehicle body, including a hatch leaf pivotably coupled to the vehicle body and movable about a hatch axis between an open hatch position and a closed hatch position, the hatch arrangement comprising:
a hatch lock arranged on the hatch leaf and including a hatch lock catch configured to
engage a hatch lock striker to retain the hatch leaf to the vehicle body when the hatch lock is in a primary latch position and a secondary latch position, and
disengage the hatch lock striker when the hatch lock is in an open latch position; and
a hatch drive arrangement coupled to the vehicle body at a connecting point and configured to move the hatch leaf between the open hatch position and the closed hatch position, and including:
a cinching system configured to move the hatch lock catch from the secondary latch position to the primary latch position,
a force transfer arrangement including a transfer element, pivotably coupled to the hatch leaf, pivotable about a lever axis from a first transfer element position to a second transfer element position, and defining a first coupling point, wherein the transfer element is coupled to the hatch drive arrangement at the first coupling point, and the force transfer arrangement is configured to transfer a force from the hatch drive arrangement to the hatch lock catch,
wherein when the hatch leaf is in the closed hatch position the hatch drive arrangement does not apply a force between the transfer element and the vehicle body,
wherein the hatch drive arrangement applies a force only to the transfer element to move the hatch lock catch from the secondary latch position to the primary latch position, and
wherein as the transfer element pivots from the first transfer element position to the second transfer element position, to move the hatch lock catch from the secondary latch position to the primary latch position, an angle defined between a first straight line, extending between the hatch axis and the lever axis, and a second straight line, extending between the first coupling point and the connecting point, is increased.

21. A hatch arrangement for a motor vehicle provided with a vehicle body, including a hatch leaf pivotably coupled to the vehicle body and movable about a hatch axis between an open hatch position and a closed hatch position, the hatch arrangement comprising:
a hatch lock arranged on the hatch leaf and including a hatch lock catch configured to,
engage a hatch lock striker to retain the hatch leaf to the vehicle body when the hatch lock catch is in a primary latch position or a secondary latch position,
disengage the hatch lock striker when the hatch lock catch is in an open latch position;
a hatch drive arrangement configured to move the hatch leaf; and
a cinching system configured to move the hatch lock catch from the secondary latch position to the primary latch position, and including,
a force transfer arrangement configured to transfer a pulling force, exerted by the hatch drive arrangement, to the hatch lock catch, and including a transfer element, coupled to the hatch drive arrangement, and a Bowden cable connecting the transfer element to the hatch lock catch, and wherein when the hatch leaf is in the closed hatch position, the hatch arrangement does not exert pulling forces between the transfer element and the vehicle body.

* * * * *